US012380756B2

(12) United States Patent
Beskitt et al.

(10) Patent No.: US 12,380,756 B2
(45) Date of Patent: Aug. 5, 2025

(54) STRIPPER ASSEMBLY

(71) Applicant: Diebold Nixdorf, Incorporated, North Canton, OH (US)

(72) Inventors: William Daniel Beskitt, Canton, OH (US); Sean Haney, North Canton, OH (US)

(73) Assignee: Diebold Nixdorf Incorporated, North Canton, OH (US)

( * ) Notice: Subject to any disclaimer, the term of this patent is extended or adjusted under 35 U.S.C. 154(b) by 755 days.

(21) Appl. No.: 17/621,275

(22) PCT Filed: Jun. 1, 2020

(86) PCT No.: PCT/US2020/035544
§ 371 (c)(1),
(2) Date: Dec. 21, 2021

(87) PCT Pub. No.: WO2020/263504
PCT Pub. Date: Dec. 30, 2020

(65) Prior Publication Data
US 2022/0375295 A1     Nov. 24, 2022

Related U.S. Application Data

(60) Provisional application No. 62/865,455, filed on Jun. 24, 2019.

(51) Int. Cl.
*B65H 29/12*     (2006.01)
*B65H 29/54*     (2006.01)
(Continued)

(52) U.S. Cl.
CPC .......... *G07D 11/16* (2019.01); *B65H 29/125* (2013.01); *B65H 29/54* (2013.01); *F16D 43/211* (2013.01);
(Continued)

(58) Field of Classification Search
CPC ..... B65H 29/54; B65H 2403/72; F16D 45/00; F16D 43/211
See application file for complete search history.

(56) References Cited

U.S. PATENT DOCUMENTS

| 4,894,783 A | 1/1990 | Milne |
| 6,745,939 B2 | 8/2004 | Force |

(Continued)

FOREIGN PATENT DOCUMENTS

| WO | 2018139209 A2 | 11/2008 |
| WO | 2018013622 A1 | 1/2018 |

OTHER PUBLICATIONS

International Search Report filed in the corresponding PCT Application dated Jul. 28, 2020; 2 pages.

(Continued)

*Primary Examiner* — Howard J Sanders
(74) *Attorney, Agent, or Firm* — Black McCuskey

(57) ABSTRACT

A stripper assembly can include a feed wheel, a stripping tire, a drag clutch, and first and second stripping elements. The feed wheel and stripping tire can be mounted for rotation in clockwise (CW) and counter-clockwise (CCW) directions and can contact one another to define a nip through which papers are directed. The drag clutch can be interposed between the stripping tire and the shaft it is mounted upon. The first and second stripping elements can be positioned on the shaft of the stripping tire on opposite sides of the nip. Each of the stripping elements can be configured and positioned to engage papers passing through the nip. The drag clutch is not interposed between either of the first and second stripping elements and the shaft of the stripping tire.

20 Claims, 10 Drawing Sheets

(51) Int. Cl.
*F16D 43/21* (2006.01)
*F16D 45/00* (2006.01)
*G07D 11/16* (2019.01)
*G07D 11/14* (2019.01)

(52) U.S. Cl.
CPC .... *F16D 45/00* (2013.01); *B65H 2301/44318* (2013.01); *B65H 2301/446* (2013.01); *B65H 2301/4474* (2013.01); *B65H 2402/30* (2013.01); *B65H 2403/72* (2013.01); *B65H 2403/73* (2013.01); *G07D 11/14* (2019.01); *G07D 2211/00* (2013.01)

(56) References Cited

U.S. PATENT DOCUMENTS

| | | | |
|---|---|---|---|
| 2004/0083176 A1* | 4/2004 | Utz | G07D 11/14 239/379 |
| 2009/0140039 A1 | 6/2009 | Force | |
| 2016/0371911 A1 | 12/2016 | Jones et al. | |

OTHER PUBLICATIONS

Written Opinion filed in the corresponding PCT Application dated Jul. 28, 2020; 5 pages.
International Preliminary Report on Patentability filed in the corresponding PCT Application dated Dec. 28, 2021; 6 pages.

\* cited by examiner

STRIPPER ASSEMBLY

CROSS-REFERENCE TO RELATED APPLICATIONS

This application is a National Phase filing of International Application Ser. No. PCT/US2020/355544, for a STRIPPER ASSEMBLY, filed Jun. 1, 2020, which claims the benefit of U.S. Provisional Patent Application Ser. No. 62/865,455 for a STRIPPER ASSEMBLY, filed on Jun. 24, 2019, and both applications are hereby incorporated by reference in their entireties.

BACKGROUND

1. Field

The present disclosure relates to Automated Transaction Machines (ATMs), alternatively referred to as an Automated Banking Machines or Automated Teller Machines.

2. Description of Related Prior Art

ATMs are commonly used to carry out a variety of financial or commercial transactions. Most commonly, these transactions include dispensing cash, checking account balances, paying bills and/or receiving deposits from users. ATMs may also perform a variety of other transactions, including the sale and purchase of tickets, issuance of coupons, check or voucher presentation, the printing of script and a variety of other functions. In carrying out these transactions or performing these functions, a variety of documents may be moved through the ATM.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A stripper assembly can include a feed wheel, a first shaft, a stripping tire, a second shaft, a drag clutch, and first and second stripping elements. The feed wheel can have a first radius and can be mounted on the first shaft for rotation in a clockwise (CW) direction and in a counter-clockwise (CCW) direction about a longitudinal axis of the first shaft. The stripping tire can have a second radius and can be mounted on the second shaft for rotation in the CW direction and in the CCW direction about a longitudinal axis of the second shaft. The feed wheel and the stripping tire can contact one another to define a nip through which papers are directed. The longitudinal axis of the first shaft and the longitudinal axis of the second shaft are a first distance apart along a first axis that is normal to both of the longitudinal axis of the first shaft and the longitudinal axis of the second shaft. The drag clutch can be interposed between the stripping tire and the second shaft. The drag clutch can include a radially-outer portion and a radially-inner portion. The drag clutch can be configured such that the radially-outer portion and the radially-inner portion are fixed together up to a predetermined level of torque and further configured such that the radially-outer portion and the radially-inner portion are rotationally moveable relative to one another in response to torque greater that the predetermined level of torque. The first and second stripping elements can be engaged with the second shaft and can be positioned on opposite sides of the nip. Each of the first and second stripping elements can be circular and can define respective third and fourth radii. Each of the first and second stripping elements can be configured and positioned to engage papers passing through the nip. The drag clutch is not interposed between either of the first and second stripping elements and the second shaft.

According to other features, the stripping tire can be directly mounted on the radially-outer portion of the drag clutch. At least one of the first and second stripping elements can be an O-ring. Both of the first and second stripping elements can be O-rings. The first stripping element can be an O-ring and the sum of the third radius and the first radius can be greater than the first distance. The third and fourth radii can be the same. Both of the first and second stripping elements can be engaged with the second shaft for rotation in only of one of the CW direction and the CCW direction about the longitudinal axis of the second shaft. The third and fourth radii can both be greater than the second radius.

In other features, the stripper assembly can also include an anchor link. The stripper assembly can also include a first one-way clutch interposed between the radially-inner portion of the drag clutch and the anchor link. The first one-way clutch and the anchor link can cooperate to prevent rotation of the radially-inner portion of the drag clutch in one of the CW direction and the CCW direction and permit rotation of the radially-inner portion of the drag clutch in the other of the CW direction and the CCW direction.

According to additional features, the first one-way clutch can include at least one of a first tab and a first notch. The at least one of the first tab and the first notch can project parallel to the longitudinal axis of the second shaft in a first direction. The radially-inner portion of the drag clutch can include the other of the at least one of the first tab and the first notch. The other of the at least one of the first tab and the first notch can project parallel to the longitudinal axis of the second shaft in a second direction opposite to the first direction. The at least one of the first tab and the first notch of the first one-way clutch can slidably and releasably engage the other of the at least one of the first tab and the first notch of the radially-inner portion of the drag clutch to interlock the first one-way clutch and the radially-inner portion of the drag clutch for concurrent rotation about the longitudinal axis of the second shaft.

According to other features, the stripper assembly can also include a second one-way clutch interposed between the radially-inner portion of the drag clutch and the second shaft. The second one-way clutch can be positioned on an opposite side of the radially-inner portion of the drag clutch relative to the first one-way clutch along the second shaft. The second one-way clutch can be configured to transmit rotation of the second shaft to the radially-inner portion of the drag clutch in only the other of the CW direction and the CCW direction.

In other features, the stripper assembly can also include a first mount supporting the first stripping element. The first mount can be disposed radially between the first stripping element and the second shaft relative to the longitudinal axis of the second shaft. The first mount can be laterally disposed between the first one-way clutch and the radially-inner portion of the drag clutch along the longitudinal axis of the second shaft.

According to additional features, the first mount can include at least one of a second tab and a second notch. The at least one of the second tab and the second notch can project radially toward the longitudinal axis of the second shaft. The at least one of the second tab and the second notch can slidably and releasably engage the other of the at least one of the first tab and the first notch of the radially-inner portion of the drag clutch to interlock the first mount and the radially-inner portion of the drag clutch for concurrent rotation about the longitudinal axis of the second shaft.

According to other features, the stripper assembly can also include a second mount supporting the second stripping element. The second mount can be disposed radially between the second stripping element and the second shaft relative to the longitudinal axis of the second shaft. The first mount can be laterally disposed between the second one-way clutch and the radially-inner portion of the drag clutch along the longitudinal axis of the second shaft.

In other features, the second mount can include at least one of a third tab and a third notch. The at least one of the third tab and the third notch can project radially toward the longitudinal axis of the second shaft. The radially-inner portion of the drag clutch can include at least one of a fourth tab and a fourth notch. The at least one of the fourth tab and the fourth notch can project along the longitudinal axis of the second shaft in the first direction. The at least one of the fourth tab and the fourth notch can be positioned on an opposite side of the radially-inner portion of the drag clutch relative to the other of the at least one of the first tab and the first notch. The at least one of the third tab and the third notch of the second mount can slidably and releasably engage the at least one of the fourth tab and the fourth notch of the radially-inner portion of the drag clutch to interlock the second mount and the radially-inner portion of the drag clutch for concurrent rotation about the longitudinal axis of the second shaft.

According to additional features, the second mount can include at least one of a tongue and a groove. The at least one of the tongue and the groove can extend parallel to the longitudinal axis of the second shaft. The second one-way clutch can include the other of the at least one of the tongue and the groove. The other of the at least one of the tongue and the groove can extend parallel to the longitudinal axis of the second shaft. The at least one of the tongue and the groove of the second mount can slidably and releasably engage the other of the at least one of the tongue and the groove of the second one-way clutch to interlock the second mount and the second one-way clutch for concurrent rotation about the longitudinal axis of the second shaft.

According to other features, the stripper assembly can also include a second one-way clutch interposed between the radially-inner portion of the drag clutch and the second shaft. The second one-way clutch can be configured to transmit rotation of the second shaft to the radially-inner portion of the drag clutch in only one of the CW direction and the CCW direction.

In other features, the stripper assembly can also include an anchor link. The stripper assembly can also include a first one-way clutch interposed between the radially-inner portion of the drag clutch and the anchor link. The first one-way clutch and the anchor link can cooperate to prevent rotation of the radially-inner portion of the drag clutch in the other of the CW direction and the CCW direction and permit rotation of the radially-inner portion of the drag clutch in the one of the the CW direction and the CCW direction. The second one-way clutch and the first one-way clutch can be positioned on opposite sides of the drag clutch along the longitudinal axis of the second shaft.

According to additional features, the second one-way clutch and the first one-way clutch and the drag clutch can be connected to one another through a plurality of interlocking tabs and notches that slidably engage one another when the second one-way clutch and the first one-way clutch and the drag clutch are moved relative to one another along the longitudinal axis of the second shaft.

According to other features, the stripper assembly can also include first and second mounts. Each of the first and second mounts can respectively support one of the first and second stripping elements. The first and second mounts and the second one-way clutch and the first one-way clutch and the drag clutch can be interconnected to one another through a plurality of interlocking tabs and notches that slidably engage one another when the first and second mounts and the second one-way clutch and the first one-way clutch and the drag clutch are moved relative to one another along the longitudinal axis of the second shaft.

BRIEF DESCRIPTION OF THE DRAWINGS

The detailed description set forth below references the following drawings.

DETAILED DESCRIPTION

Figure 1:
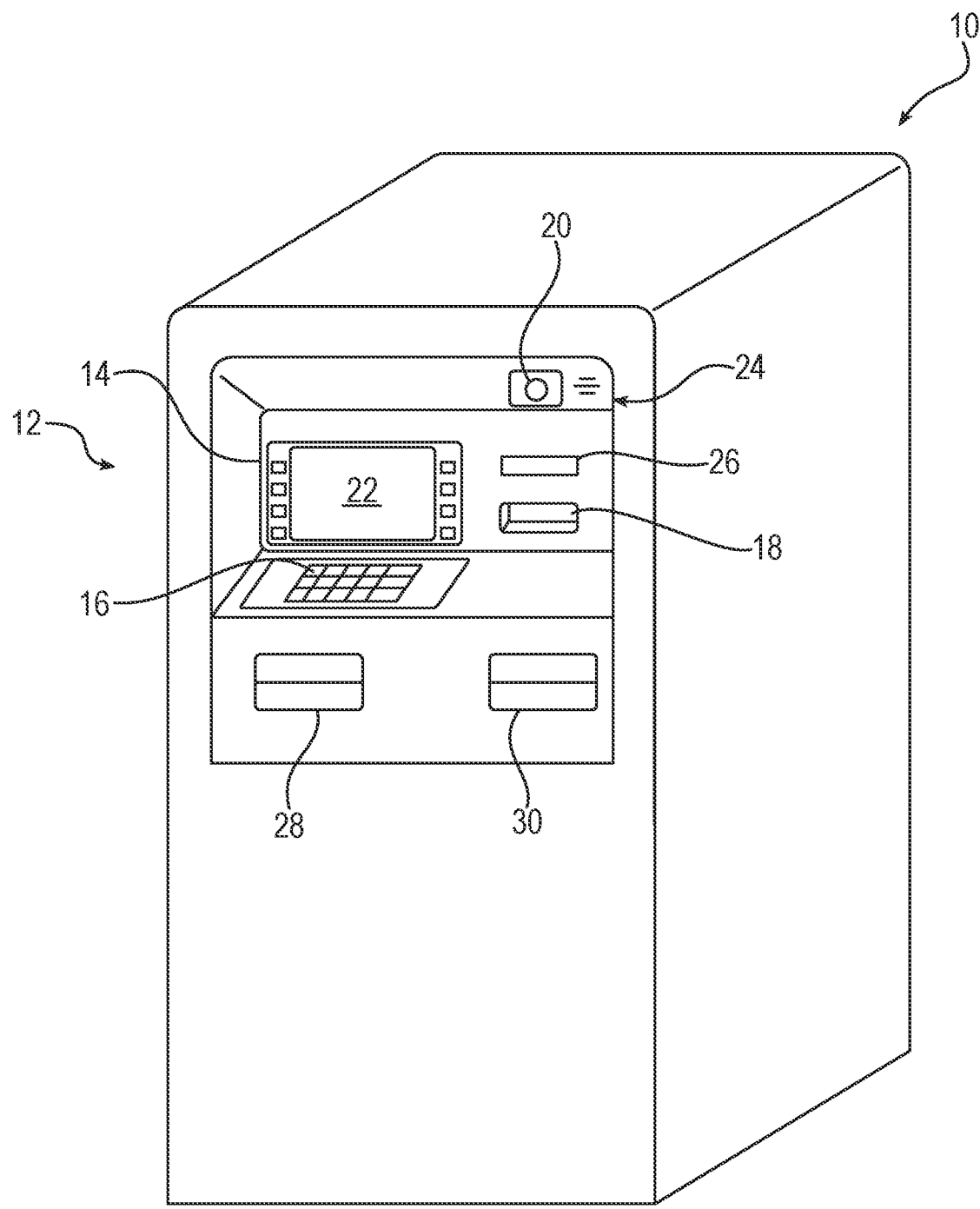
FIG. 1 is a perspective view of an ATM according to an exemplary embodiment of the present disclosure.

FIG. 1 illustrates an exemplary embodiment of an ATM 10. For purposes of this description, any device which is used for carrying out transactions involving transfers of notes of value shall be referred to as an ATM. The ATM 10 can include a user interface 12 that includes input and output devices. In the exemplary embodiment, the input devices include a plurality of function buttons 14 through which a user may provide inputs to the machine. The exemplary input devices further include a keypad 16 through which a user may provide numeric or other inputs. A further input device in this exemplary embodiment includes a card reader 18. The card reader 18 may be of the type used for reading magnetic stripe cards, smart cards or other articles presented by a user. Another input device on the exemplary ATM 10 includes an image capture device 20. The image capture device may be a camera or other device for capturing the image of a user or the surroundings of the machine. The exemplary embodiment may include biometric reading devices. Such devices may include an imaging or reading device such as a fingerprint reader, iris scan device, retina scan device or other biometric input and the like. It should be understood that the camera mentioned may serve as a biometric reading device in some embodiments.

The user interface 12 also includes output devices. In the exemplary embodiment, the output devices include a display 22. The display 22 includes a visual output device such as a cathode ray tube (CRT), liquid crystal display (LCD) or another type of display for providing messages and prompts to a user. These messages and prompts may be responded to by inputs from the user through the function buttons 14 adjacent to the display or by inputs through the keypad 16 or through other inputs. A further output device in the exemplary embodiment includes an audio output device schematically indicated 24. The audio output device may be used to provide audible outputs to the user. A further output device in the exemplary embodiment includes a printer. The printer may be used to provide outputs in the form of receipts or other items or information to the user. The printer is in connection with a printer outlet 26 in the user interface.

It should be understood that the input and output devices shown are exemplary and in other embodiments of the invention other types of input and output devices may be used. Such input and output devices commonly receive information which is usable to identify the customer or their account. Such devices are also operative to provide information to a user and to receive instructions from a user concerning transactions which are to be carried out through use of the ATM 10. Various forms of user interfaces and input and output devices may be used in connection with various embodiments.

In one exemplary embodiment, ATM 10 includes a cash dispensing mechanism. The cash dispensing mechanism is selectively operated to enable the dispensing of cash to authorized users of the machine. Cash is provided to the users through a cash outlet 28. Another exemplary embodiment has the ability to accept deposits through the ATM 10. The machine includes a deposit accepting opening 30. In the exemplary embodiment the ATM 10 is configured to accept deposits in the form of sheets, envelopes and other documents.

Figure 2:
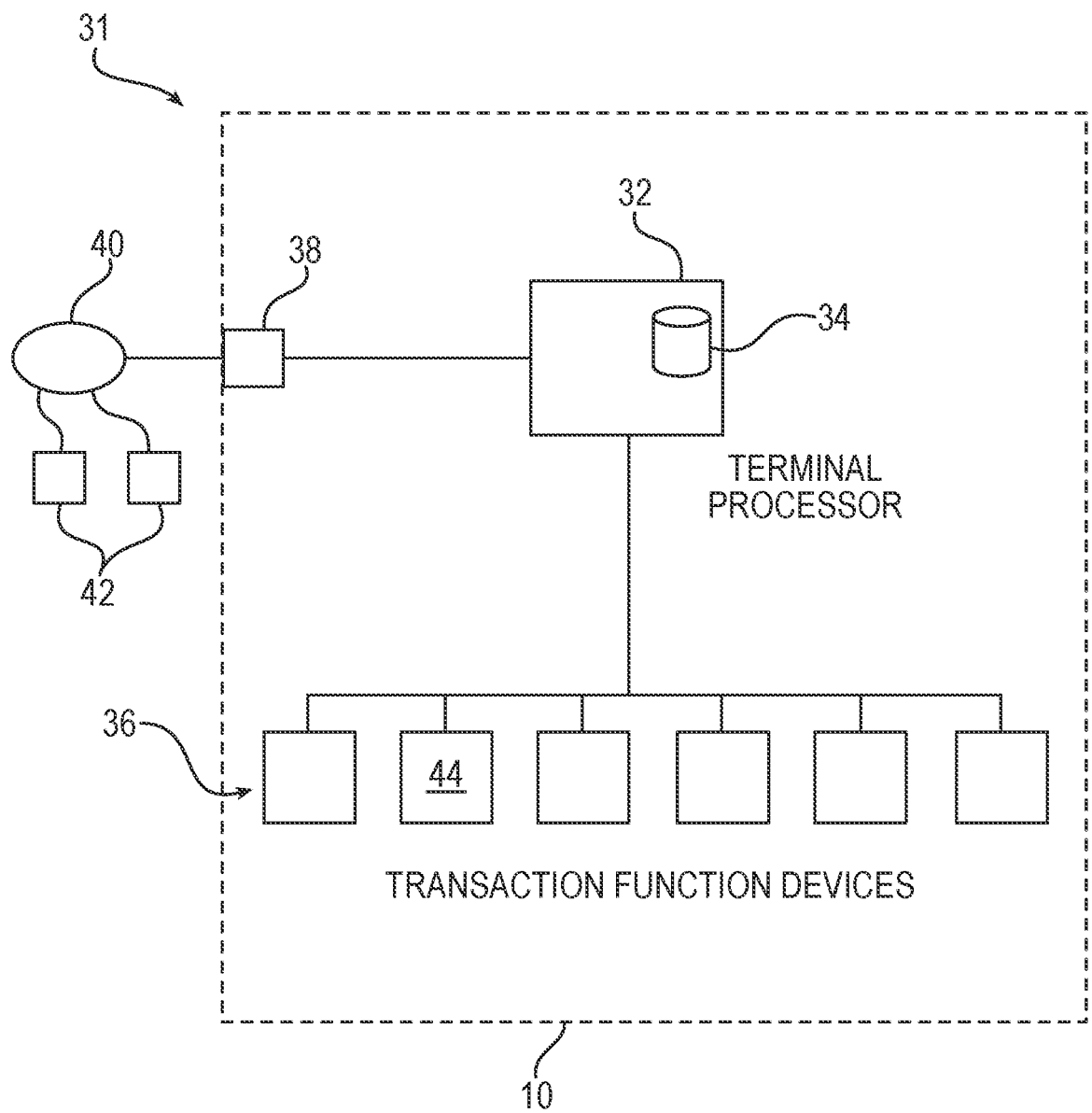
FIG. 2 is a schematic view of the ATM.

FIG. 2 illustrates an exemplary schematic view of a computer architecture associated with the ATM 10 and an exemplary system 31 in which it is used. The ATM 10 includes one or more computers, processors and other logics. The one or more computers, processors and other logics in the exemplary embodiment is schematically represented by a terminal processor 32. "Processor" and "logic," as used herein, include but are not limited to hardware, firmware, software and/or combinations of each to perform function(s) or action(s), and/or to cause a function or action from another logic, method, and/or system. For example, based on a desired application or need, a logic and/or a processor may include a software-controlled microprocessor, discrete logic, an application specific integrated circuit (ASIC), a programmed logic device, a memory device containing instructions or the like. Logic and/or processor may include one or more gates, combinations of gates, or other circuit components. Logic and/or a processor may also be fully embodied as software. Where multiple logics and/or processors are described, it may be possible to incorporate the multiple logics and/or processors into one physical logic (or processor). Similarly, where a single logic and/or processor is described, it may be possible to distribute that single logic and/or processor between multiple physical logics and/or processors.

The terminal processor 32 is in operative connection with one or more data stores schematically represented at 34. The terminal processor 32 operates to control transaction function devices 36 which are included in the ATM 10. These transaction function devices 36 include devices which operate in the ATM 10 to carry out transactions. Transaction function devices 36 may include, for example, currency dispensing mechanisms, currency presenters, currency acceptors, currency validators, item dispensing devices, card readers, printers, depositories, other input and output devices, by way of example and not limitation. Transaction function devices 36 may further include cameras, sensors, image capture devices and other items such as a transport subassembly, as described below. The particular character of the transaction function devices depends on the particular capabilities for carrying out transactions to be provided by the ATM 10.

In the exemplary embodiment, ATM 10 exchanges messages through a communication interface 38 with a communications network 40. The network 40 may be one or more types of data communications network, including an electronic funds network (EFT), a phone line, a data line, a lease line, a wireless network, a telecommunications network or other medium for communicating messages to and from the ATM 10. The communications interface 38 provided is suitable to work in connection with the particular type of network(s) to which the ATM 10 is connected. In the exemplary embodiment the ATM 10 is connected to a network which communicates with a plurality of ATMs such as, for example, Cirrus.®., Plus.®., MAC.®. or other debit card network. Of course, in other embodiments other suitable networks for processing credit, debit or other types of online transactions may be used including the Internet.

As schematically represented in example FIG. 2, the exemplary system 31 is in operative connection with one or more host computers 42. The host computers 42, in the exemplary embodiment, are operative to authorize transaction requests which are made by users at the ATM 10. The ATM 10 is operative to deliver to the host computer 42 data identifying the user and/or their account and the particular transactions that they wish to conduct. The request is routed through the network 40 to one of the host computers 42 and the host computer 42 can evaluate and authorize the request. The appropriate host computer 42 receives and analyzes the data received from the ATM 10 and returns to the ATM 10 a message which indicates whether the transaction requested is authorized and can be conducted at the ATM 10. In response to receiving a message indicating that the transaction should proceed, the ATM 10 operates the transaction function devices to carry out the requested transaction. If the transaction is not authorized, the user is so informed through the display 22 and the transaction is not completed. The ATM 10 is also operative, in the exemplary embodiment, to send to the host computer 42 that has authorized the transaction a completion message which includes data indicative of whether the transaction was able to be carried out successfully. Upon receiving the information that the transaction was carried out, the host computer 42 is operative to take appropriate action such as to credit or debit a user's account. It should be understood that this system shown in FIG. 2 is exemplary and in other embodiments other approaches to operating ATMs and authorizing transactions may be practiced.

In one example embodiment, the transaction function devices 36 include a deposit accepting apparatus 44. The deposit accepting apparatus 44 can accept deposited items such as envelopes; sheets; documents such as checks, billing statements, invoices, vouchers, wagering slips, receipts, payment documents, driver's licenses; and/or banknotes. Hereafter, the items that are accepted by the deposit accepting apparatus 44 will be referred to as a "paper" or "papers." The deposit accepting apparatus 44 can be controlled by the terminal processor 32.

Figure 3:
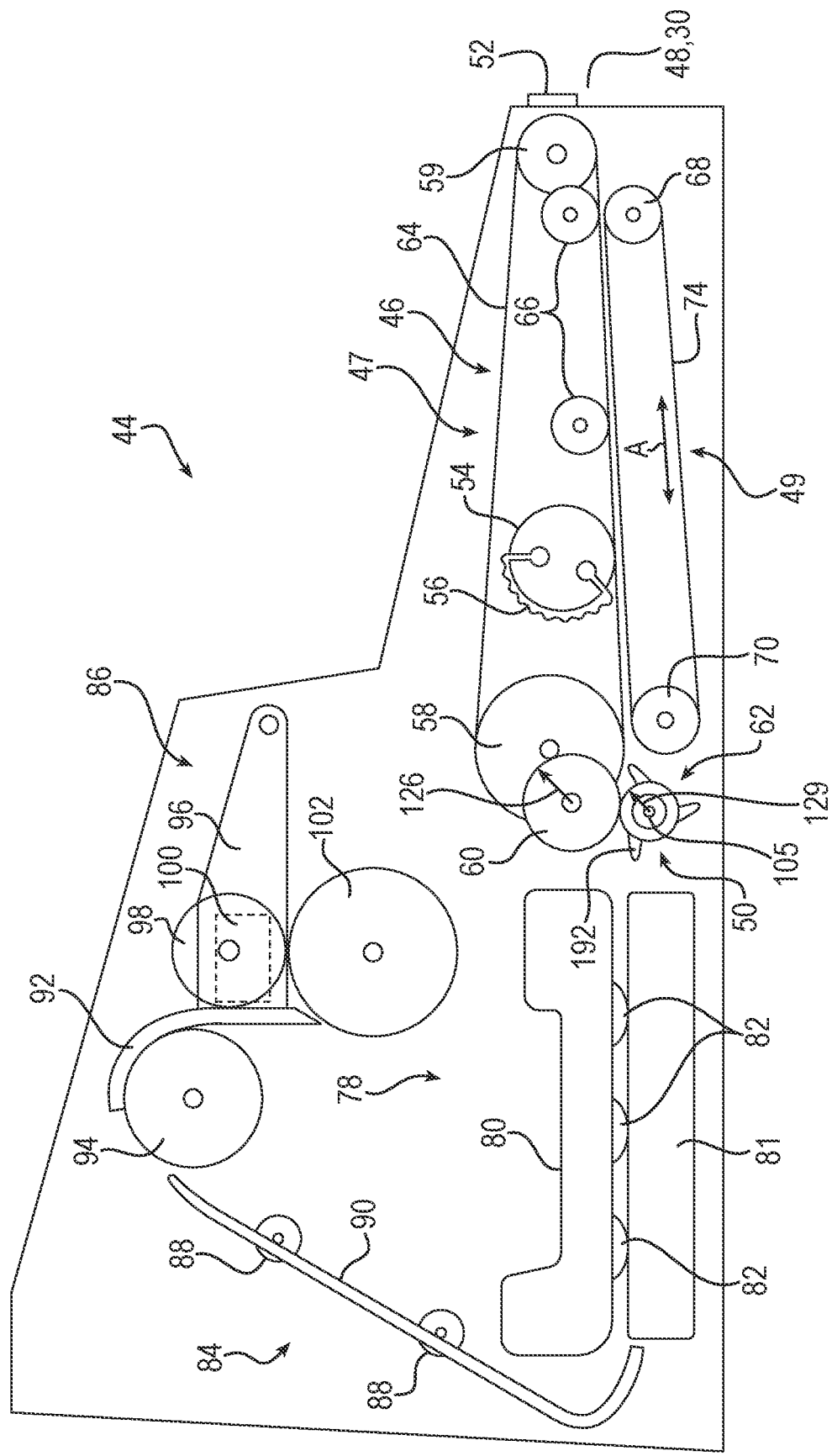
FIG. 3 is a side schematic view of an exemplary a deposit accepting apparatus of the ATM.

As illustrated in example FIG. 3, deposit accepting apparatus 44 can include a transport subassembly 46. Transport subassembly 46 extends in generally a straight path from an inlet 48 to an outlet 50. The inlet 48 is positioned adjacent to the opening 30, which communicate with the exterior of the ATM 10. Access to the transport subassembly 46 from the outside of the ATM 10 may be controlled by a gate 52 or other suitable blocking mechanism which operates under the control of the terminal processor 32. The terminal processor 32 operates to open the gate 52 only when an authorized user of the ATM 10 is to provide items to or to receive items from the transport subassembly 46 of the deposit accepting apparatus 44.

The transport subassembly 46 includes a plurality of belts or other moving members. Moving members operate to engage papers deposited into the transport subassembly 46 through inlet 48 and to move deposited papers. The double-headed arrow A represents that papers can be moved in either direction by the transport subassembly 46. Papers can be accepted by the ATM 10 and stored, or papers can be returned from the ATM 10.

In the exemplary embodiment, the belts and moving members include, for example, and upper-belt assembly 47 and a lower-belt assembly 49. The upper-belt assembly 47 includes a rear upper pulley 58 and front upper pulley 59 with one or more upper belts 64 wrapped around each of the pulleys 58, 59. The upper-belt assembly 47 can also include intermediate upper pulleys 66 that contact lower portions of the upper belt 64. The upper-belt assembly 47 can also include a thumper wheel 54 with a rubber portion 56 that spans at least a portion of the outside diameter of the thumper wheel 54. The lower-belt assembly 49 can include a front-lower belt-drive pulley 68 and rear lower belt pulley 70 with one or more lower belt 74 wrapped around the pulleys 68, 70. Papers are moved between the belts 64, 74. The transport subassembly 46 also includes a stripper assembly 62 having an upper feed wheel 60 located near the outlet 50 and generally between the upper-belt assembly 47 and the lower-belt assembly 49.

Papers can be directed to the outlet 50 and be received by a center and de-skew (CDS) subassembly 78. Papers that enter the CDS subassembly 78 are aligned with the central axis of a flow path along with the papers are traveling. The CDS subassembly 78 includes an upper CDS subassembly 80 and a lower CDS subassembly 81 that each house and provide support for various components of the CDS subassembly 78. The CDS subassembly 78 also includes transport rollers 82 that are configured to transport papers. After a paper has been aligned, the CDS subassembly 78 transports the paper to a main transport 84. While exiting the CDS subassembly 78, the paper can have any magnetic ink character recognition (MICR) indicia read by sensors within the CDS subassembly 78. In other embodiments, other image(s) may be captured while the document is in the main transport 84.

After leaving the CDS subassembly 78, the papers travel on the main transport 84 toward an escrow/printer subassembly 86. As understood by those of ordinary skill in the art, the main transport 84 may contain pulleys, belts, rollers 88, transport tracks 90 and the like for moving papers to the escrow/printer subassembly 86. An upper transport 92 in combination with an upper transport wheel 94 can redirect papers to the escrow/printer subassembly 86.

The escrow/printer subassembly 86 can include a generally horizontal support arm 96. The escrow/printer subassembly 86 can also include a pivotal printer support 98 that is pivotally attached to the support arm 96. The pivotal printer support 98 (e.g., printer housing) houses a printer 100 that pivots with the pivotal printer support 98. The printer 100 may be an ink jet printer or any other desirable printer as understood by those with ordinary skill in the art. The escrow/printer subassembly 86 can also include a paper spool 102. This configuration and arrangement allows for the printer 100 to print on one or both sides of a paper by rotating between vertical and horizontal orientations.

Figure 4:
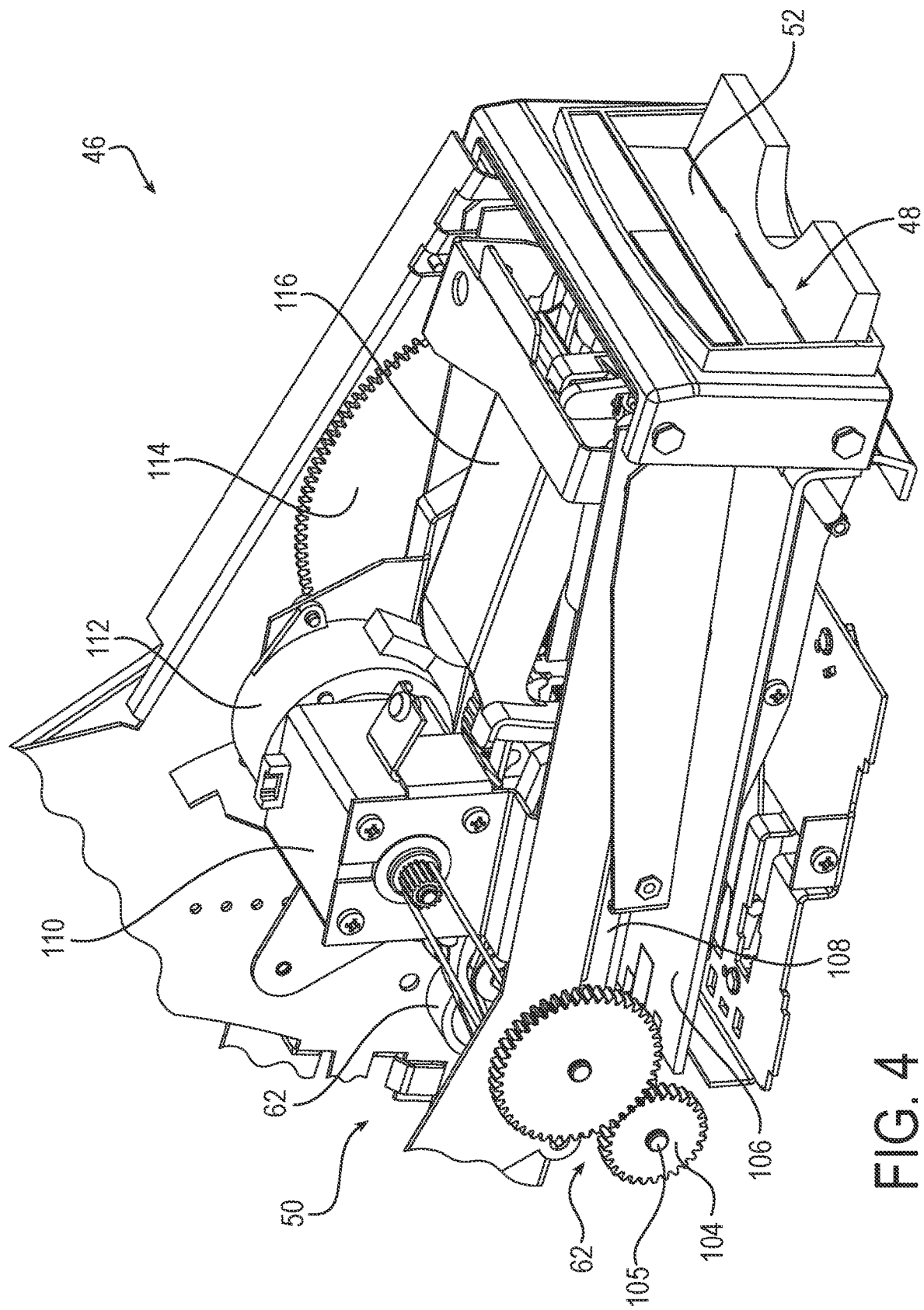
FIG. 4 is a perspective view of an exemplary transport subassembly of the exemplary deposit accepting apparatus.

FIG. 4 illustrates the exemplary embodiment of the transport subassembly 46 in more detail including the inlet 48, the outlet 50 and the gate 52. The transport subassembly 46 can also include a lower platen 106 supporting components that drive the lower belt 74, an upper platen 108 supporting components that drive the upper belt 64, a motor 110 that rotates the thumper wheel 54, a motor 112 that drives the structure(s) that drive the belt 64, a gear 114, and a note stop element 116. A gear 104 can be fixed on a shaft 105 of the stripper assembly 62.

Figure 5:
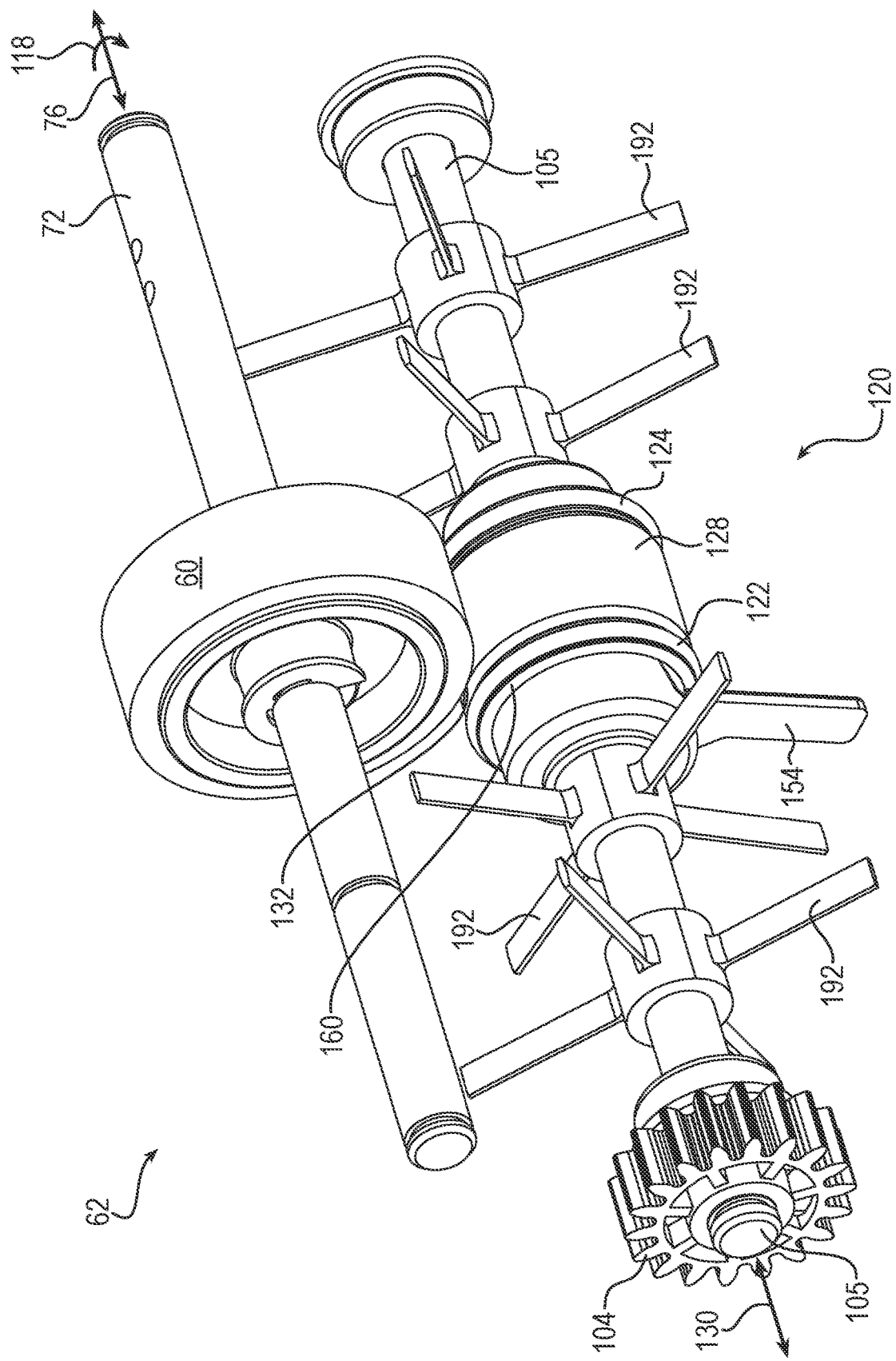
FIG. 5 is a perspective view of an exemplary stripper assembly of the exemplary transport subassembly.
Figure 6:
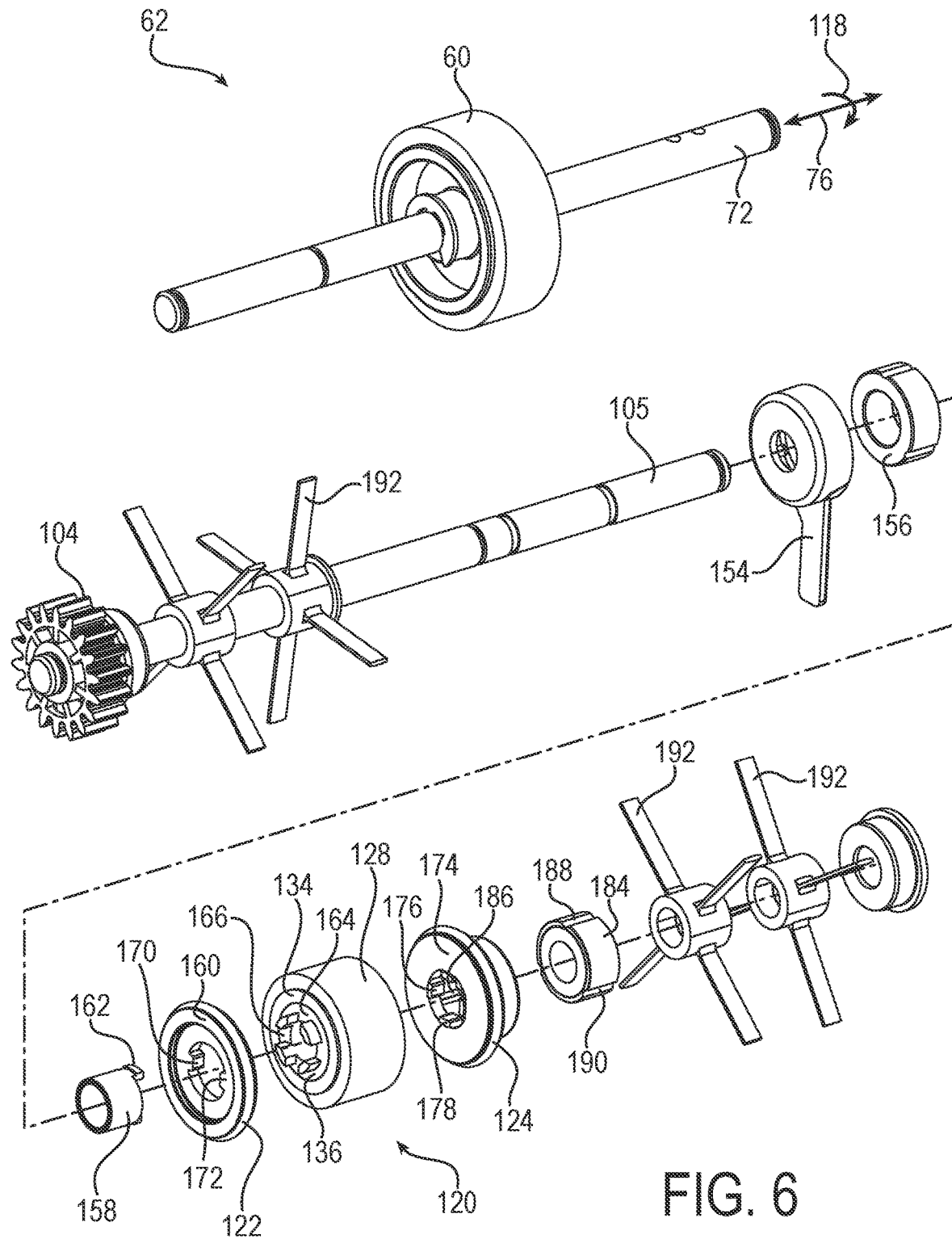
FIG. 6 is an exploded view of the exemplary stripper assembly.
Figure 7:
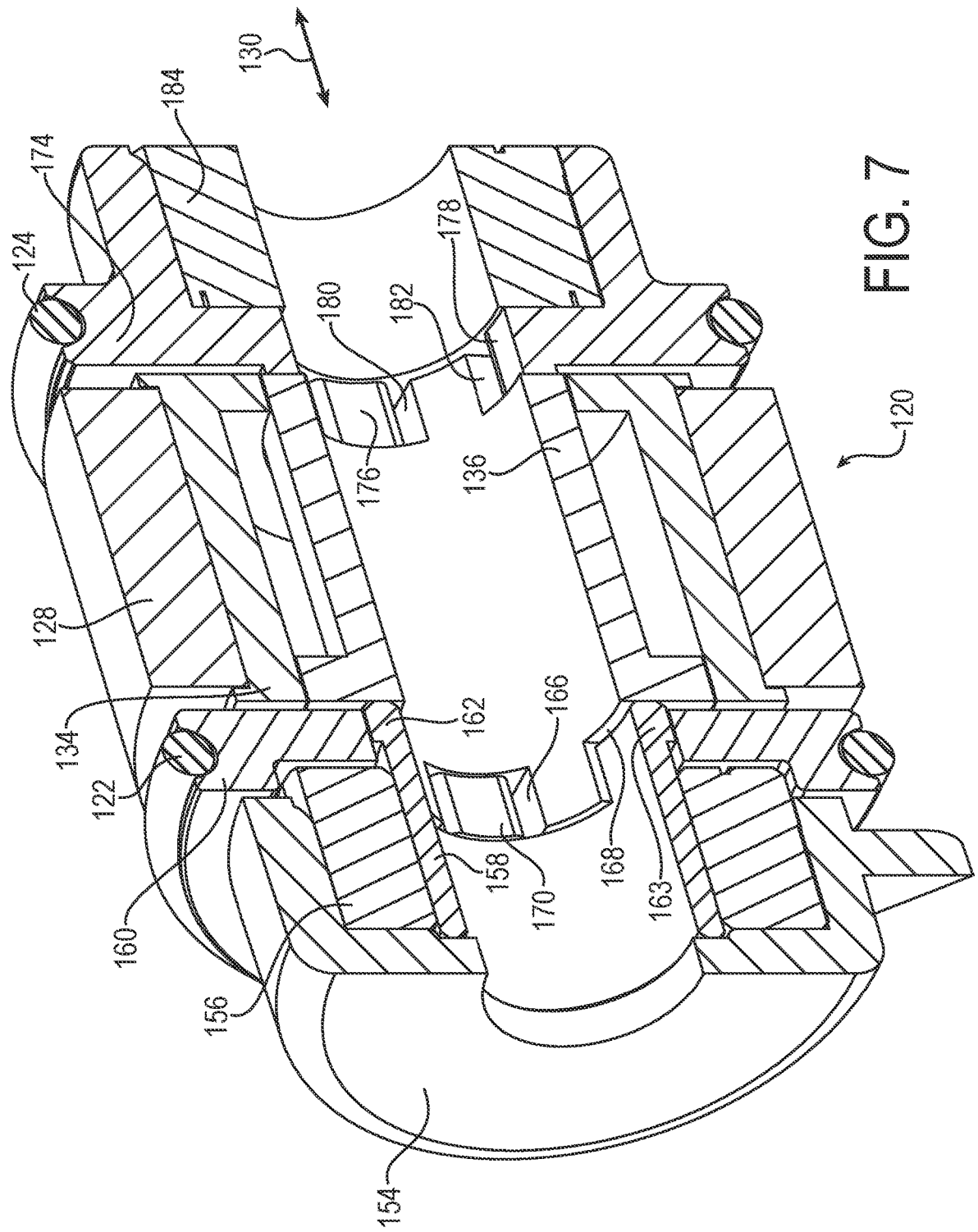
FIG. 7 is a perspective, longitudinal cross-section of a portion of the exemplary stripper assembly.

The stripper assembly 62 works both in a forward and reverse direction. In a forward direction, the stripper assembly 62 facilitates the movement of paper through the transport subassembly 46 to transport papers in an intake direction from the inlet 48 to the outlet 50 and further still, to the CDS subassembly 78. In a reverse direction that is opposite to the forward direction, the stripper assembly 62 facilitates the movement of paper in an output direction from the CDS subassembly 78, through the outlet 50, and to the inlet 48. The stripper assembly 62 is configured to separate papers that are adhering to one another. The exemplary stripper assembly 62 includes the feed wheel 60, the gear 104, and the shaft 105. Referring now to FIGS. 5-7, the exemplary stripper assembly 62 also includes a shaft 72. The feed wheel 60 is fixed on the shaft 72. An axis referenced at 76 is the central, longitudinal axis of the shaft 72. The shaft 72 can be driven in rotation by a motor. The shaft 72 can be rotated in the CW direction and the CCW direction by the motor. The CW direction is referenced by the arrow 118.

The exemplary stripper assembly 62 also includes a stripping tire 128, a drag clutch 120, and first and second stripping elements 122, 124. As referenced in FIG. 9, the feed wheel 60 can have a first radius 126 and can be mounted on the first shaft 72 for rotation in the CW direction and in the CCW direction about a longitudinal axis 76 of the first shaft 72. The perspective of FIG. 3 is to be considered for determination of the CW and CCW directions. The stripping tire 128 can have a second radius 129 and can be mounted on the second shaft 105 for rotation about a longitudinal axis 130 of the second shaft 105. The feed wheel 60 and the stripping tire 128 can contact one another to define a nip 132 through which papers are directed. The longitudinal axis 76 of the first shaft 72 and the longitudinal axis 130 of the second shaft 105 are a first distance (or absolute minimum distance) apart along a first axis 193 that is normal to both of the longitudinal axis 76 of the first shaft 72 and the longitudinal axis 130 of the second shaft 105.

The drag clutch 120 can be interposed between the stripping tire 128 and the second shaft 105. The transmission of rotation between the shaft 105 and the stripping tire 128 occurs through the drag clutch 120. The drag clutch 120 can include a radially-outer portion 134 and a radially-inner portion 136. The stripping tire 128 can be directly mounted on the radially-outer portion 134 of the drag clutch 120. The drag clutch 120 can be configured such that the radially-outer portion 134 and the radially-inner portion 136 are fixed together up to a predetermined level of torque and further configured such that the radially-outer portion 134 and the radially-inner portion 136 are rotationally moveable relative to one another in response to torque greater than the predetermined level of torque. That the radially-outer portion 134 and the radially-inner portion 136 are rotationally moveable relative to one another refers to rotation of the radially-outer portion 134 while the radially-inner portion 136 is stationary, rotation of the radially-inner portion 136 while the radially-outer portion 134 is stationary, and/or rotation of the radially-outer portion 134 in a first rotational direction (CW or CCW) during rotation of the radially-inner portion 136 in a second rotational direction that is opposite to the first rotational direction.

Figure 8:
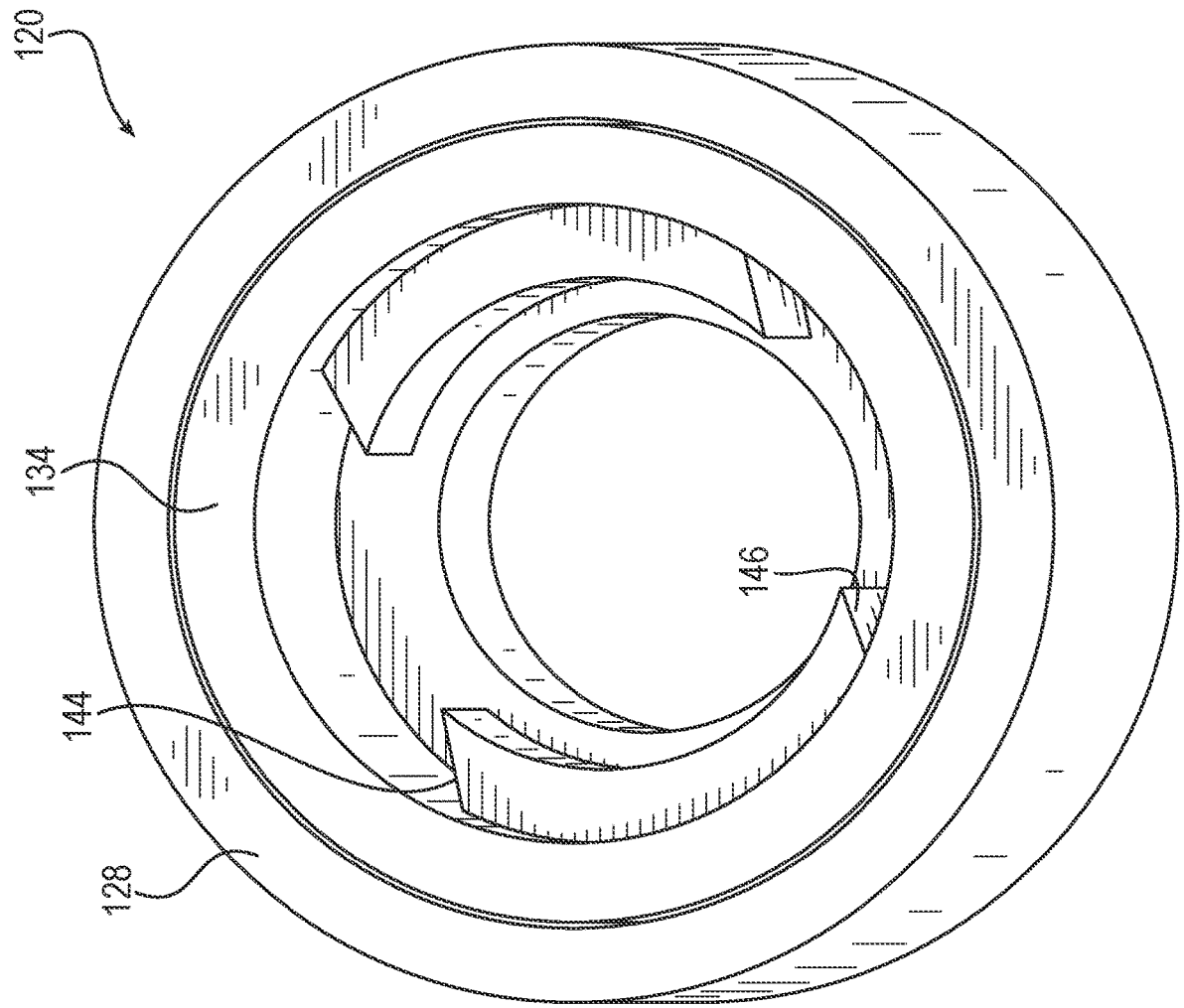
FIG. 8 is a perspective view of an exemplary drag clutch in a disassembled condition.
Figure 8:
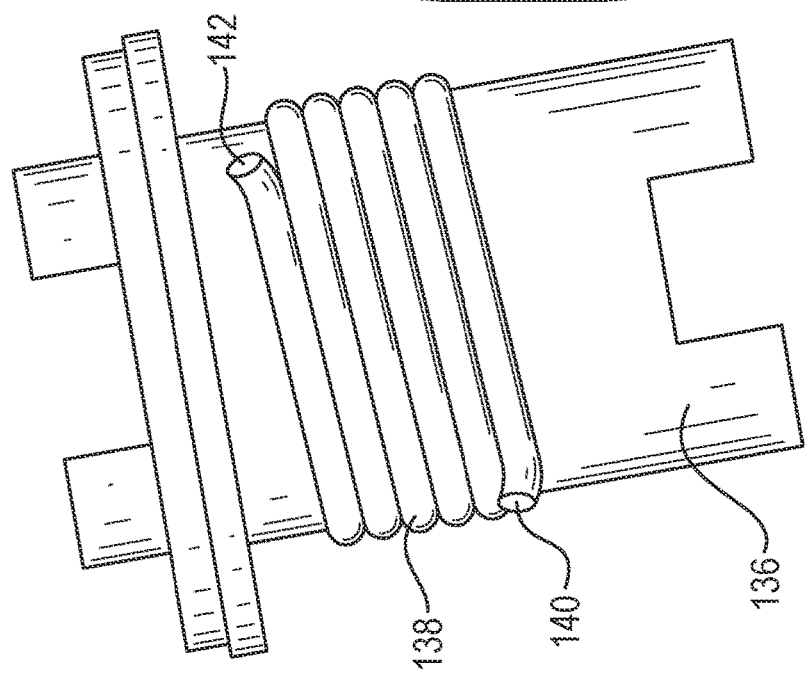

FIG. 8 is a perspective view of an exemplary drag clutch 120 in a disassembled condition. The drag clutch 120 can include a spring 138 that can be positioned between the radially-outer portion 134 and the radially-inner portion 136. The spring 138 can be the wound around the radially-inner portion 136 and include two tangs 140, 142 at opposite ends. Each of the tangs 140, 142 can be engaged with the radially-outer portion 134, such as in recesses 144, 146. Depending on the direction of relative rotation, one of the tangs 140, 142 can be subjected to force, resulting in slight unwinding of the spring 120 and loosening of the spring 120 on the radially-inner portion 136. This arrangement has been found to provide a stable torque resistance value. Friction between the spring 118 and the hub of the radially-inner portion 136 is what generates the drag torque. Other approaches to torque control are possible and can be practiced in other embodiments of the present disclosure.

Figure 9:
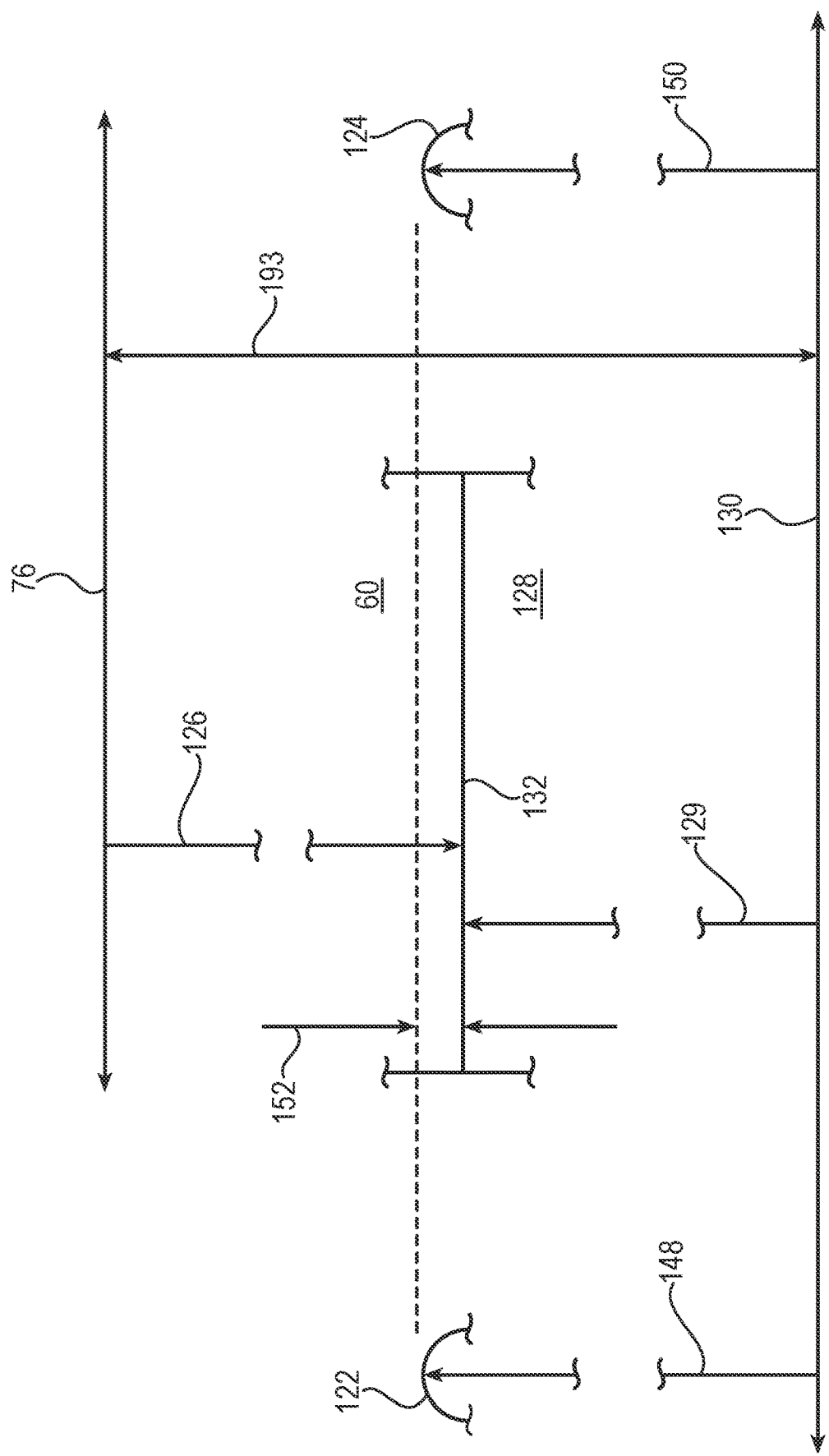
FIG. 9 is a schematic cross-section taken in a plane containing a nip.

The first and second stripping elements 122, 124 can be engaged with the second shaft 105 and can be positioned on opposite sides of the nip 132. Both of the first and second stripping elements 122, 124 can be O-rings. FIG. 9 is a schematic cross-section taken in a plane containing the axes 76, 105 and also passing through the nip 132. FIG. 9 shows portions of the feed wheel 60, the stripping tire 128, and the first and second stripping elements 122, 124. Each of the first and second stripping elements 122, 124 can be circular and can define respective third and fourth radii 148, 150. The exemplary third and fourth radii 148, 150 are the same. The third and fourth radii 148, 150 can both be greater than the second radius 129. Each of the first and second stripping elements 122, 124 can be configured and positioned to engage papers passing through the nip 132. The sum of the third radius 148 and the first radius 126, and/or the sum of the fourth radius 150 and the first radius 126 can be greater than the first distance 193. This is shown in FIG. 9 at 152, which is an overlap between the first radius 126 of the feed wheel 60 and the radii 148, 149 of the stripping elements 122, 124. The drag clutch 120 is not interposed between either of the first and second stripping elements 122, 124 and the second shaft 105.

The stripper assembly 62 can also include an anchor link 154. The anchor link 154 can be fixed to a stationary structure of the ATM 10. The exemplary anchor link 154 is fixed against rotation. The stripper assembly 62 can also include a first one-way clutch 156. The first one-way clutch 156 can be interposed between the radially-inner portion 136 of the drag clutch 120 and the anchor link 154, as described herein. In the exemplary embodiment, an exemplary inner sleeve 158 is positioned radially between the first one-way clutch 156 and the shaft 105. The exemplary inner sleeve 158 is also positioned operably between the first one-way clutch 156 and the radially-inner portion 136. The exemplary inner sleeve 158 is designated as part of the first one-way clutch 156 in the exemplary embodiment, however an inner sleeve 158 is not required in all embodiments of the present disclosure.

The exemplary first one-way clutch 156 and the anchor link 154 cooperate to prevent rotation of the radially-inner portion 136 of the drag clutch 120 in the CCW direction while permitting rotation of the radially-inner portion 136 in the CW direction. When forces tend to attempt to induce rotation of the radially-inner portion 136 of the drag clutch 120 in the CCW direction, the first one-way clutch 156 is activated and locks the radially-inner portion 136 to the anchor link 154 which does not move in the exemplary embodiment. Thus, when forces tend to attempt to induce rotation of the radially-inner portion 136 of the drag clutch 120 in the CCW direction, the first one-way clutch 156 acts as a lock between the radially-inner portion 136 and the anchor link 154 and rotation is prevented. Conversely, when forces tend to attempt to induce rotation of the radially-inner portion 136 in the CW direction, the exemplary first one-way clutch 156 is deactivated and does not lock to the radially-inner portion 136. Thus, when forces tend to attempt to induce rotation of the radially-inner portion 136 in the CW direction, the first one-way clutch 156 does not prevent the radially-inner portion 136 from rotating.

Figure 10:
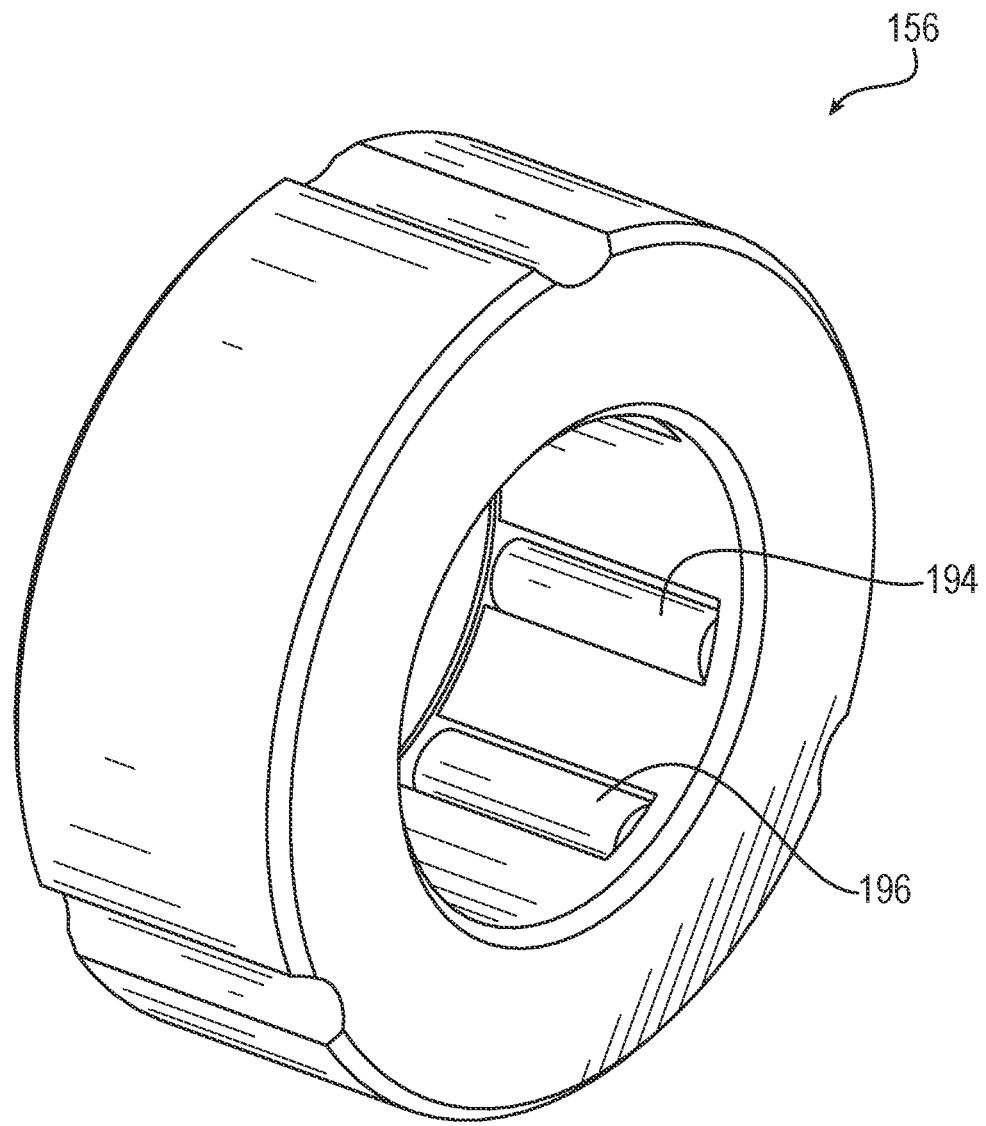
FIG. 10 is a perspective view of an exemplary one-way clutch.

The exemplary first one-way clutch 156 is a roller clutch. FIG. 10 is a perspective view of an exemplary first one-way clutch 156. The exemplary first one-way clutch 156 is not fixed to the shaft 105. The exemplary first one-way clutch 156 includes rollers, internal springs, and internal ramps. Two rollers 194, 196 are illustrated in FIG. 10 and roll on the radially outer surface of the sleeve 158. When the shaft 105 rotates CW, the sleeve 158 rotates CW and the rollers are released and turn freely. When the shaft 105 rotates CCW, forces tend to attempt to induce CCW rotation in the sleeve 158 and the rollers wedge against internal ramps and dig into the sleeve 158. This "digging in" locks the sleeve 158 and the clutch 156 to the anchor link 154.

The stripper assembly 62 can also include a first mount 160 supporting the first stripping element 122. The first mount 160 can be disposed radially between the first stripping element 122 and the second shaft 105 relative to the longitudinal axis 130 of the second shaft 105. The first mount 160 can be laterally disposed between the first one-way clutch 156 and the radially-inner portion 136 of the drag clutch 120 along the longitudinal axis 130 of the second shaft 105.

The exemplary sleeve 158 of the first one-way clutch 156 can include a pair of tabs 162, 163. The tabs 162, 163 project along the longitudinal axis 130, parallel to the longitudinal axis 130, in a first direction. Based on the perspective of FIG. 7, the exemplary first direction is from the anchor link 154, along the axis 130, toward the radially-inner portion 136. The exemplary radially-inner portion 136 of the drag clutch 120 includes a plurality of notches, including notches referenced at 164, 166, and 168. It is noted that "notches" can be viewed as the gap or space between "tabs." The notches can project parallel to the longitudinal axis 130 of the second shaft 105 in a second direction opposite to the first direction. The exemplary tabs 162, 163 slidably and releasably engage the notches 164, 168 to interlock the sleeve 158 of the first one-way clutch 156 and the radially-inner portion 136 for concurrent rotation or concurrent fixing about the longitudinal axis 130 of the second shaft 105.

The exemplary first mount 160 includes tabs 170, 172. The exemplary tabs 170, 172 project radially toward the longitudinal axis 130 of the second shaft 105. The tabs 170, 172 engage notches in the radially-inner portion 136 of the drag clutch 120 to interlock the first mount 160 and the radially-inner portion 136 of the drag clutch 120 for concurrent rotation about the longitudinal axis 130 of the second shaft 105. FIG. 7 shows the tab 170 received in the notch 166.

The stripper assembly 62 can also include a second mount 174 supporting the second stripping element 124. The second mount 174 can be disposed radially between the second stripping element 124 and the second shaft 105 relative to the longitudinal axis 130 of the second shaft 105. The second mount 174 can be laterally disposed adjacent to the radially-inner portion 136 of the drag clutch 120 along the longitudinal axis 130 of the second shaft 105.

The second mount 174 can include a plurality of tabs 176, 178. The exemplary tabs 176, 178 extend radially-inward toward the longitudinal axis 130 of the second shaft 105. The radially-inner portion 136 of the drag clutch 120 can include one or more notches, such as notches 180, 182. The notches 180, 182 can project along the longitudinal axis 130 of the second shaft 105 in the first direction. The exemplary notches 180, 182 are positioned on an opposite side of the radially-inner portion 136 of the drag clutch 120 relative to the notches 164, 166, 168. The tabs 176, 178 of the second mount 174 can slidably and releasably engage the notches 180, 182 of the radially-inner portion 136 of the drag clutch 120 to interlock the second mount 174 and the radially-inner portion 136 of the drag clutch 120 for concurrent rotation or concurrent fixing about the longitudinal axis 130 of the second shaft 105.

The stripper assembly 62 can also include a second one-way clutch 184 interposed between the radially-inner portion 136 of the drag clutch 120 and the second shaft 105. The second one-way clutch 184 can be positioned on an opposite side of the radially-inner portion 136 of the drag clutch 120 relative to the first one-way clutch 156 along the second shaft 105. The second one-way clutch 184 can be configured to transmit rotation of the second shaft 105 to the radially-inner portion 136 of the drag clutch 120 in only the CW direction. When the shaft 105 rotates in the CCW direction, the clutch 184 does not lock and therefore does not transmit rotation. The second one-way clutch 184 can be a roller clutch like the first one-way clutch 156.

The second mount 174 is also interposed between the radially-inner portion 136 of the drag clutch 120 and the second shaft 105, specifically between the radially-inner portion 136 and the second one-way clutch 184. The exemplary second mount 174 includes a plurality of tongues, such as tongue 186 visible in FIG. 6. The tongues extend parallel to the longitudinal axis 130 of the second shaft 105. The exemplary second one-way clutch 184 includes a plurality of grooves, such as grooves 188, 190. The grooves 188, 190 can extend parallel to the longitudinal axis 130 of the second shaft 105. The tongues of the second mount 174 can slidably and releasably engage the grooves of the second one-way clutch 184 to interlock the second mount 174 and the second one-way clutch 184 for concurrent rotation about the longitudinal axis 130 of the second shaft 105.

During the intake of individual papers, such as when banknotes are moved from the inlet 48 to the outlet 50 and further to the CDS subassembly 78, the shaft 72 is rotated in the CW direction to drive the feed wheel 60 to move paper in the nip 132 further into the ATM 10. The stripping tire 128 is not driven in rotation, as the rotation would be in the CCW direction and the one-way clutch 156 prevents rotation of the drag clutch 120 in the CCW direction.

During the intake of individual papers, such as banknotes, the stripping tire 128 can be rotated in the CCW direction by the feed wheel 60 if the friction contact between the feed wheel 60 and stripping tire 128, and/or between a paper and the stripping tire 128, is sufficient to allow enough torque to be transmitted to overcome the drag torque generated by the drag clutch 120. If not, the stripping tire 128 remains stationary and there is slip between the slipping tire 128 and what is contacting it.

Also, during the intake of individual papers, such as banknotes, the shaft 130 can be rotated in the CCW to rotate and position stacking paddles 192. During intake, the stacking paddles 192 guide the leading edge of each paper into the nip 132.

Also, during the intake of individual papers, such as banknotes, the second one-way clutch 184 does not transmit the CCW rotation of the shaft 105 to the second mount 174 and the other components locked to the second mount 174, including the radially-inner portion 136, the sleeve 158, the first mount 160, and the first one-way clutch 156.

Also, during the intake of individual papers, such as banknotes, the first and second stripping elements 122, 124 do not rotate and thus inhibit the movement of paper. The elements 122, 124 cooperate with the feed wheel 60 to perform "waffle stripping" for separating two pieces of paper so that a single paper can be fed through the nip 132. As the feed wheel 60 drives a "top" piece of paper through the nip 132, the stationary elements 122, 124 retard movement of a "bottom" piece of paper, thus separating the two pieces of paper.

During the output of papers, such as when banknotes are moved from the CDS subassembly 78, through the outlet 50, and then through the inlet 48, the shaft 72 is rotated in the CCW direction to drive the feed wheel 60 and the shaft 105 is rotated in the CW to drive the stripping tire 128. The stripping tire 128 is driven through the one-way clutch 184, the second mount 174, and the drag clutch 120. The sleeve 158, which has been designated as part of the one-way clutch 156, freely rotates with the drag clutch 120. The first mount 160 also rotates with the sleeve 158 and thus also rotates with the stripping tire 128. In the exemplary embodiment, feed wheel 60 is rotated slightly faster than the stripping wheel 128 so that there is no extra drag on the stripping wheel 128 from the feed wheel 60.

Also, during the output of papers, such as banknotes, rotation of the shaft 105 drives the stacking paddles 192 in CW rotation. The stacking paddles 192, in the CW direction, provide a space so that the trailing edge of a first, leading paper does not impede movement of the leading edge of a second, trailing paper.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein is hereby unconditionally reserved. The use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure; an "invention" is defined by the content of a patent claim and not by the content of a detailed description of an embodiment of an invention.

What is claimed is:

1. A stripper assembly comprising:
a feed wheel having a first radius and mounted on a first shaft for rotation in a clockwise (CW) direction and in a counter-clockwise (CCW) direction about a longitudinal axis of said first shaft;
a stripping tire having a second radius and mounted on a second shaft for rotation in the CW direction and in the CCW direction about a longitudinal axis of said second shaft, wherein said feed wheel and said stripping tire contact one another to define a nip through which papers are directed, and wherein said longitudinal axis of said first shaft and said longitudinal axis of said second shaft are a first distance apart along a first axis that is normal to both of said longitudinal axis of said first shaft and said longitudinal axis of said second shaft;
a drag clutch interposed between said stripping tire and said second shaft, said drag clutch including a radially-outer portion and a radially-inner portion, said drag clutch configured such that said radially-outer portion and said radially-inner portion are fixed together up to a predetermined level of torque and further configured such that said radially-outer portion and said radially-inner portion are rotationally moveable relative to one another in response to torque greater that the predetermined level of torque;
first and second stripping elements engaged with said second shaft and positioned on opposite sides of said nip, each of said first and second stripping elements being circular and defining respective third and fourth radii, each of said first and second stripping elements configured and positioned to engage papers passing through said nip, and wherein said drag clutch is not interposed between either of said first and second stripping elements and said second shaft;
an anchor link; and
a first one-way clutch interposed between said radially-inner portion of said drag clutch and said anchor link, said first one-way clutch and said anchor link cooperating to prevent rotation of said radially-inner portion of said drag clutch in one of the CW direction and the CCW direction and permit rotation of said radially-inner portion of said drag clutch in the other of the CW direction and the CCW direction;
wherein:
said first one-way clutch further comprises at least one of a first tab and a first notch, said at least one of said first tab and said first notch projecting parallel to said longitudinal axis of said second shaft in a first direction;
said radially-inner portion of said drag clutch further comprises the other of said at least one of said first tab and said first notch, said other of said at least one of said first tab and said first notch projecting parallel to said longitudinal axis of said second shaft in a second direction opposite to said first direction; and
said at least one of said first tab and said first notch of said first one-way clutch slidably and releasably engages said other of said at least one of said first tab and said first notch of said radially-inner portion of said drag clutch to interlock said first one-way clutch and said radially-inner portion of said drag clutch for concurrent rotation about said longitudinal axis of said second shaft.

2. The stripper assembly of claim 1 wherein said stripping tire is further defined as directly mounted on said radially-outer portion of said drag clutch.

3. The stripper assembly of claim 1 wherein at least one of said first and second stripping elements is further defined as an O-ring.

4. The stripper assembly of claim 3 wherein both of said first and second stripping elements are further defined as O-rings.

5. The stripper assembly of claim 1 wherein said first stripping element is further defined as an O-ring and wherein the sum of said third radius and said first radius is greater than said first distance.

6. The stripper assembly of claim 1 wherein said third and fourth radii are the same.

7. The stripper assembly of claim 1 wherein both of said first and second stripping elements are engaged with said second shaft for rotation in only of one of the CW direction and the CCW direction about said longitudinal axis of said second shaft.

8. The stripper assembly of claim 1 wherein said third and fourth radii are both greater than said second radius.

9. The stripper assembly of claim 1 further comprising:
a second one-way clutch interposed between said radially-inner portion of said drag clutch and said second shaft, said second one-way clutch positioned on an opposite side of said radially-inner portion of said drag clutch relative to said first one-way clutch along said second shaft, said second one-way clutch configured to transmit rotation of said second shaft to said radially-inner portion of said drag clutch in only the other of the CW direction and the CCW direction.

10. The stripper assembly of claim 9 further comprising:
a first mount supporting said first stripping element, said first mount disposed radially between said first stripping element and said second shaft relative to said longitudinal axis of said second shaft, and said first mount laterally disposed between said first one-way clutch and said radially-inner portion of said drag clutch along said longitudinal axis of said second shaft.

11. The stripper assembly of claim 10 wherein said first mount further comprises:
at least one of a second tab and a second notch, said at least one of said second tab and said second notch projecting radially toward said longitudinal axis of said second shaft, wherein said at least one of said second tab and said second notch slidably and releasably engages said other of said at least one of said first tab and said first notch of said radially-inner portion of said drag clutch to interlock said first mount and said radially-inner portion of said drag clutch for concurrent rotation about said longitudinal axis of said second shaft.

12. The stripper assembly of claim 11 further comprising:
a second mount supporting said second stripping element, said second mount disposed radially between said second stripping element and said second shaft relative to said longitudinal axis of said second shaft, and said second mount laterally disposed between said second one-way clutch and said radially-inner portion of said drag clutch along said longitudinal axis of said second shaft.

13. The stripper assembly of claim 12 wherein:
said second mount further comprises at least one of a third tab and a third notch, said at least one of said third tab and said third notch projecting radially toward said longitudinal axis of said second shaft;
said radially-inner portion of said drag clutch further comprises at least one of a fourth tab and a fourth notch, said at least one of said fourth tab and said fourth notch projecting along said longitudinal axis of said second shaft in the first direction, said at least one of said fourth tab and said fourth notch positioned on an opposite side of said radially-inner portion of said drag clutch relative to said other of said at least one of said first tab and said first notch; and
said at least one of said third tab and said third notch of said second mount slidably and releasably engages said at least one of said fourth tab and said fourth notch of said radially-inner portion of said drag clutch to interlock said second mount and said radially-inner portion of said drag clutch for concurrent rotation about said longitudinal axis of said second shaft.

14. The stripper assembly of claim 13 wherein:
said second mount further comprises at least one of a tongue and a groove, said at least one of said tongue and said groove extending parallel to said longitudinal axis of said second shaft;
said second one-way clutch further comprises the other of said at least one of said tongue and said groove, said other of said at least one of said tongue and said groove extending parallel to said longitudinal axis of said second shaft; and
said at least one of said tongue and said groove of said second mount slidably and releasably engages said other of said at least one of said tongue and said groove of said second one-way clutch to interlock said second mount and said second one-way clutch for concurrent rotation about said longitudinal axis of said second shaft.

15. A stripper assembly comprising:
a feed wheel having a first radius and mounted on a first shaft for rotation in a clockwise (CW) direction and in a counter-clockwise (CCW) direction about a longitudinal axis of said first shaft;
a stripping tire having a second radius and mounted on a second shaft for rotation in the CW direction and in the CCW direction about a longitudinal axis of said second shaft, wherein said feed wheel and said stripping tire contact one another to define a nip through which papers are directed, and wherein said longitudinal axis of said first shaft and said longitudinal axis of said second shaft are a first distance apart along a first axis that is normal to both of said longitudinal axis of said first shaft and said longitudinal axis of said second shaft;
a drag clutch interposed between said stripping tire and said second shaft, said drag clutch including a radially-outer portion and a radially-inner portion, said drag clutch configured such that said radially-outer portion and said radially-inner portion are fixed together up to a predetermined level of torque and further configured such that said radially-outer portion and said radially-inner portion are rotationally moveable relative to one another in response to torque greater that the predetermined level of torque;
first and second stripping elements engaged with said second shaft and positioned on opposite sides of said nip, each of said first and second stripping elements being circular and defining respective third and fourth radii, each of said first and second stripping elements configured and positioned to engage papers passing through said nip, and wherein said drag clutch is not interposed between either of said first and second stripping elements and said second shaft;
a second one-way clutch interposed between said radially-inner portion of said drag clutch and said second shaft, said second one-way clutch configured to transmit rotation of said second shaft to said radially-inner portion of said drag clutch in only one of the CW direction and the CCW direction;
an anchor link; and
a first one-way clutch interposed between said radially-inner portion of said drag clutch and said anchor link, said first one-way clutch and said anchor link cooperating to prevent rotation of said radially-inner portion of said drag clutch in the other of the CW direction and the CCW direction and permit rotation of said radially-inner portion of said drag clutch in the one of the CW direction and the CCW direction, wherein said second one-way clutch and said first one-way clutch are positioned on opposite sides of said drag clutch along said longitudinal axis of said second shaft;
wherein said second one-way clutch and said first one-way clutch and said drag clutch are connected to one another through a plurality of interlocking tabs and notches that slidably engage one another when said second one-way clutch and said first one-way clutch and said drag clutch are moved relative to one another along said longitudinal axis of said second shaft.

16. The stripper assembly of claim 15 wherein said stripping tire is further defined as directly mounted on said radially-outer portion of said drag clutch.

17. The stripper assembly of claim 15 wherein both of said first and second stripping elements are engaged with said second shaft for rotation in only of one of the CW direction and the CCW direction about said longitudinal axis of said second shaft.

18. A stripper assembly comprising:
a feed wheel having a first radius and mounted on a first shaft for rotation in a clockwise (CW) direction and in a counter-clockwise (CCW) direction about a longitudinal axis of said first shaft;
a stripping tire having a second radius and mounted on a second shaft for rotation in the CW direction and in the CCW direction about a longitudinal axis of said second shaft, wherein said feed wheel and said stripping tire contact one another to define a nip through which papers are directed, and wherein said longitudinal axis of said first shaft and said longitudinal axis of said second shaft are a first distance apart along a first axis that is normal to both of said longitudinal axis of said first shaft and said longitudinal axis of said second shaft;
a drag clutch interposed between said stripping tire and said second shaft, said drag clutch including a radially-outer portion and a radially-inner portion, said drag clutch configured such that said radially-outer portion and said radially-inner portion are fixed together up to a predetermined level of torque and further configured such that said radially-outer portion and said radially-inner portion are rotationally moveable relative to one another in response to torque greater that the predetermined level of torque;
first and second stripping elements engaged with said second shaft and positioned on opposite sides of said nip, each of said first and second stripping elements being circular and defining respective third and fourth radii, each of said first and second stripping elements configured and positioned to engage papers passing through said nip, and wherein said drag clutch is not interposed between either of said first and second stripping elements and said second shaft;

a second one-way clutch interposed between said radially-inner portion of said drag clutch and said second shaft, said second one-way clutch configured to transmit rotation of said second shaft to said radially-inner portion of said drag clutch in only one of the CW direction and the CCW direction;

an anchor link:

a first one-way clutch interposed between said radially-inner portion of said drag clutch and said anchor link, said first one-way clutch and said anchor link cooperating to prevent rotation of said radially-inner portion of said drag clutch in the other of the CW direction and the CCW direction and permit rotation of said radially-inner portion of said drag clutch in the one of the CW direction and the CCW direction, wherein said second one-way clutch and said first one-way clutch are positioned on opposite sides of said drag clutch along said longitudinal axis of said second shaft; and first and second mounts, each respectively supporting one of said first and second stripping elements, wherein said first and second mounts and said second one-way clutch and said first one-way clutch and said drag clutch are interconnected to one another through a plurality of interlocking tabs and notches that slidably engage one another when said first and second mounts and said second one-way clutch and said first one-way clutch and said drag clutch are moved relative to one another along said longitudinal axis of said second shaft.

19. The stripper assembly of claim 18 wherein said stripping tire is further defined as directly mounted on said radially-outer portion of said drag clutch.

20. The stripper assembly of claim 18 wherein both of said first and second stripping elements are engaged with said second shaft for rotation in only of one of the CW direction and the CCW direction about said longitudinal axis of said second shaft.

\* \* \* \* \*